(12) United States Patent
Ozawa et al.

(10) Patent No.: US 9,496,092 B2
(45) Date of Patent: Nov. 15, 2016

(54) FLAME-RETARDANT ELECTROLYTIC CAPACITOR

(71) Applicants: NIPPON CHEMI-CON CORPORATION, Tokyo (JP); TOSOH F-TECH, INC., Shunan-shi, Yamaguchi (JP)

(72) Inventors: Masashi Ozawa, Tokyo (JP); Junichi Kawakami, Tokyo (JP); Hideyuki Mimura, Shunan (JP); Hisao Eguchi, Shunan (JP)

(73) Assignees: NIPPON CHEMI-CON CORPORATION, Tokyo (JP); TOSOH F-TECH, INC., Shunan-shi, Yamaguchi (JP)

( * ) Notice: Subject to any disclaimer, the term of this patent is extended or adjusted under 35 U.S.C. 154(b) by 110 days.

(21) Appl. No.: 14/411,414

(22) PCT Filed: Jul. 1, 2013

(86) PCT No.: PCT/JP2013/068064
§ 371 (c)(1),
(2) Date: Dec. 26, 2014

(87) PCT Pub. No.: WO2014/024603
PCT Pub. Date: Feb. 13, 2014

(65) Prior Publication Data
US 2015/0325381 A1 Nov. 12, 2015

(30) Foreign Application Priority Data

Aug. 10, 2012 (JP) ................. 2012-177768

(51) Int. Cl.
| | | |
|---|---|---|
| H01G 11/54 | (2013.01) | |
| H01G 9/145 | (2006.01) | |
| H01G 11/58 | (2013.01) | |
| H01G 9/035 | (2006.01) | |

(52) U.S. Cl.
CPC .............. *H01G 9/145* (2013.01); *H01G 9/035* (2013.01); *H01G 11/54* (2013.01); *H01G 11/58* (2013.01)

(58) Field of Classification Search
None
See application file for complete search history.

(56) References Cited

U.S. PATENT DOCUMENTS

| | | | |
|---|---|---|---|
| 5,629,829 A | 5/1997 | Ikeya | |
| 2008/0254361 A1* | 10/2008 | Horikawa | H01M 10/052 429/188 |
| 2012/0141883 A1* | 6/2012 | Smart | H01M 10/0567 429/331 |
| 2012/0301795 A1* | 11/2012 | Kaneko | H01G 9/038 429/303 |
| 2013/0279080 A1* | 10/2013 | Aoyama | H01G 9/008 361/534 |
| 2014/0038059 A1* | 2/2014 | Li | H01M 10/052 429/330 |

FOREIGN PATENT DOCUMENTS

| | | |
|---|---|---|
| JP | 01-095512 A | 4/1989 |
| JP | 03-180014 A | 8/1991 |
| JP | 05-243089 A | 9/1993 |
| JP | 08-088146 A | 4/1996 |
| JP | 10-116629 A | 5/1998 |
| JP | 2000-348764 A | 12/2000 |
| JP | 2009-163939 A | 7/2009 |
| JP | 2011-129773 A | 6/2011 |
| JP | 2011-141974 A | 7/2011 |

OTHER PUBLICATIONS

Extended European search report for European Patent Application No. 13828126.6, Mar. 2, 2016.

* cited by examiner

*Primary Examiner* — Dion R Ferguson
(74) *Attorney, Agent, or Firm* — Shapiro, Gabor and Rosenberger, PLLC

(57) ABSTRACT

Provided is a flame-retardant electrolytic capacitor which is capable of maintaining flame-retardant effect even after a prolonged period of time. This is an electrolytic capacitor comprising an anode foil that is provided with an oxide film on the surface, a cathode foil, a separator, and an electrolytic solution that contains a solute in a solvent, wherein a phosphoric acid ester amide represented by the following general formula (1) is contained in the electrolytic solution:

[Chemical Formula 1]

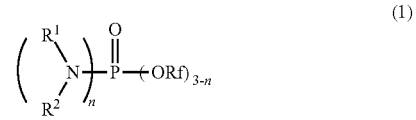

(1)

in which n is 1 or 2, and $R^1$ and $R^2$ each independently represent a linear or branched alkyl group having 1 to 10 carbon atoms, and Rf represents a linear or branched fluoroalkyl group having 1 to 10 carbon atoms or a linear or branched alkyl group having 1 to 10 carbon atoms).

14 Claims, 1 Drawing Sheet

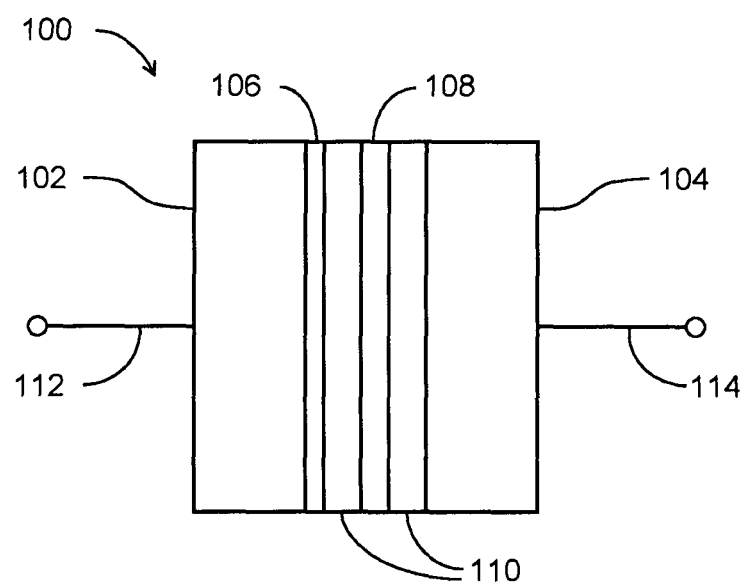

FLAME-RETARDANT ELECTROLYTIC CAPACITOR

TECHNICAL FIELD

The present invention relates to an electrolytic capacitor, more specifically an electrolytic capacitor which is capable of maintaining good flame-retardancy even after a prolonged period of time.

BACKGROUND ART

Electrolytic capacitors have characteristics of being compact and having large capacity, and are broadly employed as a configuration part of various electronic instruments, in-car equipments, and the like. An electrolytic capacitor comprises an anode foil having an oxide film on the surface, a cathode foil, and a separator, and has a structure consisting of an element obtained by interpositioning and winding a separator between the anode foil and the cathode foil and soaking this in an electrolytic solution. A solution of boric acid or carboxylic acid, or an ammonium salt thereof etc. dissolved in a flammable organic solvent such as ethylene glycol and γ-butyrolactone is used here as the electrolytic solution.

For this reason, when excessive electrical stress is applied to the electrolytic capacitor and the safe valve is set off, there is a risk that sparks generated from short circuiting etc. will ignite the gasified electrolytic solution and burn the element. Accordingly, there have been investigations to render flame-retardancy to electrolytic capacitors.

Patent Literatures 1 and 2 disclose a method of employing a flame-retardant separator. With this method, although the burning of the electrolytic capacitor itself is suppressed, rendering flame-retardancy to the electrolytic solution component that is ejected from the safe valve is difficult. On the other hand, Patent Literatures 3 and 4 disclose a technology of adding a phosphate ester such as trimethyl or triethyl phosphate to the electrolytic solution to render flame-retardancy in order to prevent the electrolytic solution component from burning.

RELATED TECHNICAL DOCUMENTS

Patent Documents

Patent Document 1: JP H5-243089 A
Patent Document 2: JP 2011-129773 A
Patent Document 3: JP H1-95512 A
Patent Document 4: JP H3-180014 A Although electrolytic capacitors are generally manufactured under ambient pressure, natural fibers employed as separators or electrolytic solutions have the nature to absorb moisture in the air. For this reason, even when an electrolytic solution that does not have any water added is employed, the electrolytic capacitor element after manufacture typically contains moisture. Conventionally, trimethyl or triethyl phosphate used as flame retardants tend to react with the moisture in the element and cause hydrolysis. For this reason, there was a problem that trimethyl or triethyl phosphate would be degraded after a prolonged period of time and will no longer be able to exert flame-retardant effect.

SUMMARY OF THE INVENTION

The present invention was achieved in light of the above problem, the object of which is to provide a flame-retardant electrolytic capacitor which has good flame-retardancy and is capable of maintaining flame-retardant effect even after a prolonged period of time.

As a result of repeated extensive investigations by the present inventors to solve the above problem, it was found that by containing phosphoric acid ester amide in the electrolytic solution, the electrolytic capacitor will have good flame-retardancy and will be capable of maintaining good flame-retardant effect even after a prolonged period of time, as well as be significantly improved in voltage proof property, to thus complete the present invention.

In other words, the flame-retardant electrolytic capacitor of the present invention comprises: an anode foil that is provided with an oxide film on the surface; a cathode foil; a separator; and an electrolytic solution that contains a solute in a solvent, wherein a phosphoric acid ester amide represented by the following general formula (1) or the following general formula (2) is contained in the electrolytic solution:

[Chemical Formula 1]

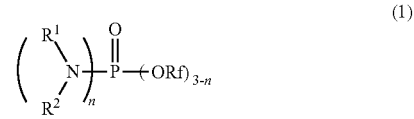

(1)

in which n is 1 or 2, and $R^1$ and $R^2$ each independently represent a linear or branched alkyl group having 1 to 10 carbon atoms, and Rf represents a linear or branched fluoroalkyl group having 1 to 10 carbon atoms or a linear or branched alkyl group having 1 to 10 carbon atoms;

[Chemical Formula 2]

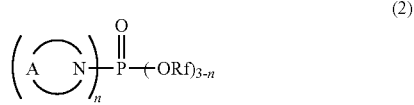

(2)

in which n is 1 or 2, and A represents a polymethylene group having 4 to 7 carbon atoms, a group in which at least one position of the C—C bonds in a polymethylene group having 4 to 7 carbon atoms is a C—O—C bond, a group in which at least one position of the C—C bonds in a polymethylene group having 4 to 7 carbon atoms is a C—NH—C bond, or a group in which at least one position of the C—C bonds in a polymethylene group having 4 to 7 carbon atoms is a C—N(CH$_3$)—C bond, and Rf represents a linear or branched fluoroalkyl group having 1 to 10 carbon atoms or a linear or branched alkyl group having 1 to 10 carbon atoms.

Moreover, the flame-retardant electrolytic capacitor of the present invention is characterized in that wherein the phosphoric acid ester amide is represented by the following general formula (3) or the following general formula (4):

[Chemical Formula 3]

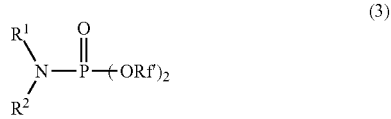

(3)

in which $R^{1'}$ and $R^{2'}$ each independently represent a linear or branched alkyl group having 1 to 10 carbon atoms, and Rf' represents a linear or branched fluoroalkyl group having 1 to 10 carbon atoms;

[Chemical Formula 4]

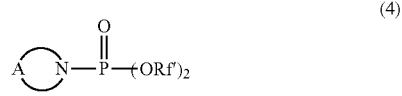
(4)

in which A represents a polymethylene group having 4 to 7 carbon atoms, a group in which at least one position of the C—C bonds in a polymethylene group having 4 to 7 carbon atoms is a C—O—C bond, a group in which at least one position of the C—C bonds in a polymethylene group having 4 to 7 carbon atoms is a C—NH—C bond, or a group in which at least one position of the C—C bonds in a polymethylene group having 4 to 7 carbon atoms is a C—N(CH$_3$)—C bond, and Rf' represents a linear or branched fluoroalkyl group having 1 to 10 carbon atoms.

Moreover, the phosphoric acid ester amide represented by any of the general formulae (1) to (4) is contained at 5 to 30 wt % of the total electrolytic solution.

Moreover, according to the flame-retardant electrolytic capacitor of the present invention a phosphate diester anion represented by the following general formula (5) is further contained in the electrolytic solution:

[Chemical Formula 5]

(5)

in which Rf$^1$ and Rf$^2$ represents a linear or branched fluoroalkyl group having 1 to 10 carbon atoms or a linear or branched alkyl group having 1 to 10 carbon atoms.

Moreover, the phosphate diester anion represented by the general formula (5) is preferably contained at 0 to 50 wt % of the total electrolytic solution.

Further, the flame-retardant electrolytic capacitor of the present invention preferably has a moisture content of 10 wt % or less in an element of the electrolytic capacitor.

According to the present invention, an electrolytic capacitor can be provided which has good flame-retardancy, is improved in voltage proof property, and maintains good flame-retardant effect even after a prolonged period of time.

Further, since the electrolytic capacitor of the present invention can exert a flame-retardant effect even when an electrolytic solution that contains water is used, it can provide an electrolytic capacitor with low equivalent series resistance (ESR).

BRIEF DESCRIPTION OF THE DRAWING

The sole FIGURE is a schematic view of the electrolytic capacitor of the invention.

DESCRIPTION OF EMBODIMENTS

The electrolytic capacitor of the present invention contains the phosphoric acid ester amide represented by the general formulae (1) to (4) in the electrolytic solution. The phosphoric acid ester amide of general formula (1) to (4) has one or two amide moieties, and it is thought that phosphoric acid ester amides have the nature to be less susceptible to hydrolysis due to electronic and steric effects thereof. For this reason, by containing the phosphoric acid ester amide in the electrolytic solution, an electrolytic capacitor in which flame-retardancy is maintained over a prolonged period of time can be obtained.

Moreover, by binding a fluorine atom in the ester side chain of the phosphoric acid ester amide, superior flame-retardant effects that are noticeable even with a small addition of phosphoric acid ester amide, and a flame-retardant electrolytic capacitor having good properties can be obtained.

Further, although the mode of action is unclear, by containing the phosphoric acid ester amide of general formulae (1) to (4) in the electrolytic solution, an effect of significantly improving the voltage proof of the electrolytic capacitor can be rendered.

(Phosphoric Acid Ester Amide)

In general formula (1), n is 1 or 2, and $R^1$ and $R^2$ each independently represent a linear or branched alkyl group having 1 to 10 carbon atoms. Note that $R^1$ and $R^2$ may be substituted by a substituent such as an alkoxy group, a hydroxy group, an amino group, an N-alkylamino group, an N,N-dialkylamino group, a fluorine atom, an aryl group, an alkylthio group, and a nitrile group. Rf represents a linear or branched fluoroalkyl group having 1 to 10 carbon atoms or a linear or branched alkyl group having 1 to 10 carbon atoms.

Examples of $R^1$ and $R^2$ can include a methyl group, an ethyl group, an n-propyl group, an isopropyl group, an n-butyl group, a sec-butyl group, a t-butyl group, an n-amyl group, an n-hexyl group, an n-octyl group, an n-decyl group, and the like. Examples of $R^1$ and $R^2$ substituted by a substituent can include a 2-methoxyethyl group, a 2-hydroxyethyl group, a 2-aminoethyl group, a 2-(N-methylamino) ethyl group, a 2-(N,N-dimethylamino)ethyl group, a 2-phenylethyl group, a 2-methylthioethyl group, a 2-cyanoethyl group, and the like. Examples of Rf can include a methyl group, an ethyl group, an n-propyl group, an isopropyl group, an n-butyl group, a sec-butyl group, a t-butyl group, an n-amyl group, an n-hexyl group, an n-octyl group, an n-decyl group, a trifluoromethyl group, a 2-fluoroethyl group, a 2,2-difluoroethyl group, a 2,2,2-trifluoroethyl group, a 2,2,3,3-tetrafluoropropyl group, a 2,2,3,3,3-pentafluoropropyl group, a hexafluoroisopropyl group, a 2,2,3,3,4,4,5,5-octafluoropentyl group, a 2,2,3,3,4,4,5,5,6,6,7,7-dodecafluoroheptyl group, a 3,3,4,4,5,5,6,6,7,7,8,8,9,9,10,10,10-heptadecafluorodecyl group, and the like.

Examples of the phosphoric acid ester amide of general formula (1) wherein n=1 can include dimethyl diethylamide phosphate, bis(trifluoromethyl) diethylamide phosphate, diethyl diethylamide phosphate, bis(2,2,2-trifluoroethyl) dimethylamide phosphate, bis(2,2,2-trifluoroethyl) diethylamide phosphate, bis(2,2,2-trifluoroethyl) di-n-propylamide phosphate, bis(2,2,2-trifluoroethyl) diisopropylamide phosphate, bis(2,2,2-trifluoroethyl) di-n-butylamide phosphate, bis(2,2,2-trifluoroethyl) di-sec-butylamide phosphate, bis(2,2,2-trifluoroethyl) di-t-butylamide phosphate, bis(2,2,2-trifluoroethyl) di-n-hexylamide phosphate, bis(2,2,2-trifluoroethyl) di-n-octylamide phosphate, bis(2,2,2-trifluoroethyl) di-n-decylamide phosphate, bis(2,2,2-trifluoroethyl) ethylmethylamide phosphate, bis(2,2,3,3-tetrafluoropropyl) diethylamide phosphate, bis(2,2,3,3,3-pentafluoropropyl) diethylamide phosphate, bis(2,2,3,3,4,4,5,5-octafluoropentyl) diethylamide phosphate, bis(2,2,3,3,4,4,5,5,5-nonafluoropentyl) diethylamide phosphate, bis(2,2,3,3,4,4,5,5,6,6,7,7-dodecafluoroheptyl) diethylamide phosphate, bis(3,3,4,4,5,5,6,6,7,7,8,8,9,9,10,10,10-heptadecafluorodecyl) diethylamide phosphate, and the like. Examples of those wherein n=2 can include bis(diethylamide) methyl phosphate, bis(diethylamide) trifluoromethyl phosphate, bis(diethylamide) ethyl phosphate, bis(dimethylamide) 2,2,2-trifluoroethyl phosphate, bis(diethylamide) 2,2,2-trifluoroethyl phosphate, bis(di-n-propylamide) 2,2,2-trifluoroethyl phosphate, bis(diisopropylamide) 2,2,2-trifluoroethyl phosphate, bis(di-n-butylamide) 2,2,2-trifluoroethyl phosphate, bis(di-sec-butylamide) 2,2,2-trifluoroethyl phosphate, bis(di-n-hexylamide) 2,2,2-trifluoroethyl phosphate, bis(di-n-octylamide) 2,2,2-trifluoroethyl phosphate, bis(di-n-decylamide) 2,2,2-trifluoroethyl phosphate, bis(ethylmethylamide) 2,2,2-trifluoroethyl phosphate, bis(diethylamide) 2,2,3,3-tetrafluoropropyl phosphate, bis(diisopropylamide) 2,2,3,3-tetrafluoropropyl phosphate, bis(diethylamide) 2,2,3,3,3-pentafluoropropyl phosphate, bis(diethylamide) 2,2,3,3,4,4,5,5-octafluoropentyl phosphate, bis(diisopropylamide) 2,2,3,3,4,4,5,5,6,6,7,7-dodecafluoroheptyl phosphate, bis(diethylamide) 3,3,4,4,5,5,6,6,7,7,8,8,9,9,10,10,10-heptadecafluorodecyl phosphate, and the like.

In general formula (2), n is 1 or 2, and A represents a polymethylene group having 4 to 7 carbon atoms, a group in which at least one position of the C—C bonds in a polymethylene group having 4 to 7 carbon atoms is a C—O—C bond, a group in which at least one position of the C—C bonds in a polymethylene group having 4 to 7 carbon atoms is a C—NH—C bond, or a group in which at least one position of the C—C bonds in a polymethylene group having 4 to 7 carbon atoms is a C—N(CH$_3$)—C bond. Rf represents a linear or branched fluoroalkyl group having 1 to 10 carbon atoms.

Examples of the phosphoric acid ester amide of general formula (2) wherein n=1 can include bis(2,2,2-trifluoroethyl) pyrrolidide phosphate, bis(2,2,2-trifluoroethyl) piepridide phosphate, bis(2,2,2-trifluoroethyl) hexamethyleneimide phosphate, bis(2,2,2-trifluoroethyl) heptamethyleneimide phosphate, bis(2,2,2-trifluoroethyl) morpholide phosphate, bis(2,2,2-trifluoroethyl) piperadide phosphate, bis(2,2,2-trifluoroethyl) N'-methylpiperadide phosphate, and the like. Examples of those wherein n=2 can include bispyrrolidide 2,2,2-trifluoroethyl phosphate, bispiepridide 2,2,2-trifluoroethyl phosphate, bis(hexamethyleneimide) 2,2,2-trifluoroethyl phosphate, bis(heptamethyleneimide) 2,2,2-trifluoroethyl phosphate, bismorpholide 2,2,2-trifluoroethyl phosphate, bispiperadide 2,2,2-trifluoroethyl phosphate, bis(N'-methylpiperadide) 2,2,2-trifluoroethyl phosphate, and the like.

Among the phosphoric acid ester amides of general formula (1) or (2), cases where n=1 and Rf is a fluoroalkyl group respectively are preferred from the flame-retardancy aspect of the electrolytic capacitor, and in particular, bis(2,2,2-trifluoroethyl) diethylamide phosphate and bis(2,2,2-trifluoroethyl) diisopropylamide phosphate are preferred from the performance aspects such as the flame-retardancy and the ESR of the electrolytic capacitor.

(Amount of Addition)

The amount of the fluorine-containing phosphoric acid ester amide of general formulae (1) to (4) added is not particularly limited, but preferably in the range of 5 to wt % of the total electrolytic solution, further preferably in the range of 10 to 20 wt %. When the amount of the flame retardants added against the total electrolytic solution is greater than 30 wt %, there are risks that specific resistance of the electrolytic solution is increased or the flame retardants will become less soluble in the electrolytic solution, and when it is less than 5 wt %, sufficient flame-retardant effect cannot be obtained.

(Solvent)

A protic polar solvent, an aprotic polar solvent, or a mixture thereof can be employed as the solvent for the electrolytic solution of the electrolytic capacitor of the present invention. Protic polar solvents include monovalent alcohols (such as ethanol, propanol, 1-butanol, 2-butanol, pentanol, 3-methyl-1-butanol, hexanol, 2-methyl-1-pentanol, 3-methyl-1-pentanol, 2-methyl-1-pentanol, 3-methyl-1-pentanol, 4-methyl-2-pentanol, 1-octanol, 2-octanol, 1-nonanol, 1-decanol, cyclobutanol, cyclopentanol, cyclohexanol, and benzyl alcohol), polyvalent alcohols and oxy-alcohol compounds (such as ethylene glycol, propylene glycol, 1,3-butanediol, 1,2-pentanediol, 2-methylpentan-2,4-diol (hexylene glycol), 2-ethyl-1,3-hexanediol, trimethylpentadiol, 2-methyl-2-propyl-1,3-pentadiol, 1,2-decanediol, glycerin, 1,2,4-butanetriol, 1,2,6-hexanetriol, methyl cellosolve, ethyl cellosolve, 2-methoxy-1-butanol, 3-methoxy-1-butanol, ethylene glycol monoisobutyl ether, ethylene glycol monohexyl ether, diethylene glycol, diethylene glycol mono-n-butyl ether, diethylene glycol monohexyl ether, triethylene glycol monoethyl ether, triethylene glycol monoisopropyl ether, triethylene glycol monobutyl ether, methoxy propylene glycol, and dimethoxy propanol), and the like.

Moreover, aprotic polar solvents include amides (such as N-methylformamide, N,N-dimethylformamide, N-ethylformamide, N,N-diethylformamide, N-methylacetamide, N,N-dimethylacetamide, N-ethylacetamide, N,N-diethylacetamide, and hexamethylphosphoric amide), lactones (such as γ-butyrolactone, δ-valerolactone, and γ-valerolactone), sulfolanes (such as sulfolane, 3-methylsulfolane, and 2,4-dimethylsulfolane), cyclic amides (such as N-methyl-2-pyrrolidone), carbonates (such as ethylene carbonate, propylene carbonate, and isobutylene carbonate), nitriles (such as acetonitrile), sulfoxides (such as dimethyl sulfoxide), 2-imidazolidinones [1,3-dialkyl-2-imidazolidinone (such as 1,3-dimethyl-2-imidazolidinone, 1,3-diethyl-2-imidazolidinone, and 1,3-di(n-propyl)-2-imidazolidinone), and 1,3,4-trialkyl-2-imidazolidinone (such as 1,3,4-trimethyl-2-imidazolidinone)], and the like. Among these, γ-butyrolactone, ethylene glycol, and sulfolane are preferably employed because of good electrolytic capacitor properties. Moreover, water may be contained in the solvent.

When polyvalent alcohols having a low number of carbon atoms such as ethylene glycol are employed as the solvent, the phosphoric acid ester amide represented by the general formulae (1) to (4) may be less soluble. In such a case, the solubility of the phosphoric acid ester amide can be improved by using this in combination with a protic polar solvent or an aprotic polar solvent having a higher number of carbon atoms.

(Phosphate Diester Anion)

Moreover, the electrolytic capacitor of the present invention can contain the phosphate diester anion represented by the general formula (5) in the electrolytic solution. Similarly to the phosphoric acid ester amide, since this phosphate diester anion is less susceptible to hydrolysis, and has a flame-retardant effect, the flame-retardancy of the electrolytic capacitor can be further improved by allowing this to be contained. In particular, when polyvalent alcohols having a low number of carbon atoms such as ethylene glycol are used as the solvent and thus the phosphoric acid ester amide represented by the general formulae (1) to (4) is less soluble, it is effective to use a phosphate diester anion in combination. In other words, since the phosphate diester anion represented by the general formula (5) is easily dissolved in ethylene glycol etc., sufficient flame-retardant effect can be obtained by using these in combination. Moreover, since the phosphate diester anion of general formula (5) acts not only as a flame retardant but also as a solute, the equivalent series resistance (ESR) of the electrolytic capacitor can be reduced by addition thereof.

In general formula (5), $Rf^1$ and $Rf^2$ each independently represents a linear or branched fluoroalkyl group having 1 to 10 carbon atoms or a linear or branched alkyl group having 1 to 10 carbon atoms. Note that the alkyl group may be substituted by a substituent such as an alkoxy group, a hydroxy group, an amino group, an N-alkylamino group, an N,N-dialkylamino group, a fluorine atom, an aryl group, a thioalkyl group, and a nitrile group.

Examples of an alkyl group can include a methyl group, an ethyl group, an n-propyl group, an isopropyl group, an n-butyl group, a sec-butyl group, a t-butyl group, an n-amyl group, an n-hexyl group, an n-octyl group, an n-decyl group, and the like. Examples of an alkyl group substituted by a substituent can include a 2-methoxyethyl group, a 2-hydroxyethyl group, a 2-aminoethyl group, a 2-(N-methylamino) ethyl group, a 2-(N,N-dimethylamino)ethyl group, a 2-phenylethyl group, a 2-methylthioethyl group, a 2-cyanoethyl group, and the like. Moreover, examples of a fluorine-containing alkyl group can include a trifluoromethyl group, a 2-fluoroethyl group, a 2,2-difluoroethyl group, a 2,2,2-trifluoroethyl group, a 2,2,3,3-tetrafluoropropyl group, a 2,2,3,3,3-pentafluoropropyl group, a hexafluoroisopropyl group, a 2,2,3,3,4,4,5,5-octafluoropentyl group, a 2,2,3,3,4,4,5,5,6,6,7,7-dodecafluoroheptyl group, a 3,3,4,4,5,5,6,6,7,7,8,8,9,9,10,10,10-heptadecafluorodecyl group, and the like.

Among the phosphate diester anions of general formula (5), cases where $Rf^1$ and $Rf^2$ are fluoroalkyl groups are superior in flame-retardant effect, and in particular, bis(2,2,2-trifluoroethyl) phosphate anion is preferred from the performance aspects such as the flame-retardancy and the ESR of the electrolytic capacitor.

(Method of Addition)

As shown in formula (6) below, the phosphate diester anion of general formula (5) may be generated in the electrolytic solution by containing it in the electrolytic solution as a phosphate diester (7), adding ammonia or amine and the like to the electrolytic solution to adjust the pH, or a phosphate diester salt (8) may be separately prepared and added to the electrolytic solution as a salt. A salt herein includes an ammonium salt, a quaternary ammonium salt, an amine salt, a quaternary imidazolium salt, or a quaternary amidinium salt, and the like.

[Chemical Formula 6]

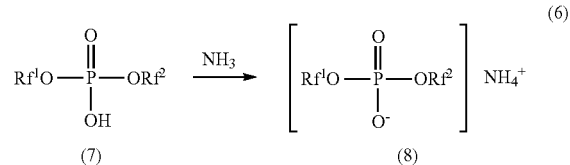

(Amount of Addition)

The amount of the phosphate diester anion of general formula (5) added is not particularly limited, but preferably in the range of 0 to 50 wt % of the total electrolytic solution, further preferably in the range of 5 to 25 wt %. When the amount of phosphate diester anion added to the total electrolytic solution is greater than 50 wt %, there is a risk that voltage proof will be difficult to raise.

(Solute)

Solutes that can be employed are an organic or inorganic acid or a salt thereof alone or in combination. Organic acids that can be employed are aliphatic monocarboxylic acids such as formic acid, acetic acid, propionic acid, and enanthic acid, aliphatic dicarboxylic acids such as malonic acid, succinic acid, glutaric acid, adipic acid, methylmalonic acid, pimelic acid, suberic acid, azelaic acid, sebacic acid, dodecanoic diacid, 1,6-decanedicarboxylic acid, undecanoic diacid, tridecanoic diacid, maleic acid, citraconic acid, and itaconic acid, as well as aromatic carboxylic acids such as benzoic acid, phthalic acid, salicylic acid, toluic acid, and pyromellitic acid, and the like. Inorganic acids that can be employed are boric acid, phosphoric acid, silic acid, and the like.

Salts of organic and inorganic acids listed above include an ammonium salt, a quaternary ammonium salt, an amine salt, a quaternary imidazolium salt, a quaternary amidinium salt, and the like. Quaternary ammonium ions of quaternary ammonium salts include tetramethylammonium, triethylmethylammonium, tetraethylammonium, and the like. Amines of amine salts include a primary amine, a secondary amine, and a tertiary amine. Primary amines include methylamine, ethylamine, propylamine, and the like, secondary amines include dimethylamine, diethylamine, ethylmethylamine, dibutylamine, and the like, and tertiary amines include trimethylamine, triethylamine, tributylamine, ethyldiisopropylamine, and the like. Quaternary imidazolium ions of quaternary imidazolium salts include ethyldimethylimidazolium, tetramethylimidazolium, and the like. For quaternary amidiniums salts, ethyldimethylimidazolinium, tetramethylimidazolinium, and the like may be used. The concentration of these solutes to the solvent may be a saturating concentration or less.

Moreover, the phosphate diester anions described above can also be employed alone as a solute, or can be employed in combination with an organic or inorganic acid or a salt thereof.

(Additive)

An aromatic nitro compound such as nitrophenol, nitrobenzoic acid, nitroacetophenone, nitrobenzyl alcohol, 2-(nitrophenoxy)ethanol, nitroanisole, nitrophenetole, nitrotoluene, and di-nitrobenzene can be added with the objective to extend the lifetime properties of the electrolytic capacitor.

Moreover, a nonionic surfactant, a polyoxyalkylene polyvalent alcohol ether compound obtained by addition polymerization of a polyvalent alcohol with ethylene oxide and/or propylene oxide, a polyvinyl alcohol, polysaccharides (such as mannite, sorbit, and pentaerythritol), a complex compound of boric acid with polysaccharides, a colloidal silica, and the like may also be added with the objective to further improve the voltage proof of the electrolytic capacitor.

(Anode Foil, Cathode Foil, and Separator)

As illustrated in the sole drawing FIGURE, an electrolytic capacitor 100 of the invention comprises an anode foil 102, having an oxide film 106, and a cathode foil 104, separated by a separator 108, provided between the anode foil 102 and cathode foil 104. An electrolytic solution 110 fills the region between the anode foil 102 and the cathode foil 104 and impregnates the separator 108. An anode lead 112 and a cathode lead 114 are provided.

As the anode or cathode foil of the electrolytic capacitor of the present invention, a valve metal and the like such as aluminum and tantalum can be employed. The anode foil is subjected to etching treatment and the like in order to increase the contact area with the electrolytic solution, and an oxide film is formed by chemical conversion treatment. The cathode foil that can be employed is an electrode foil subjected to etching treatment or a plain foil without etching treatment and the like, and may have an oxide film formed by chemical conversion treatment. A separator is provided between the anode and cathode foils. Separators that can be employed here are a natural fiber separator such as manila and kraft, a synthetic fiber separator such as polypropylene and polyethylene, or a mixed separator of synthetic and natural fibers, and the like.

(Moisture Content in Element)

The moisture content in the element of the electrolytic capacitor is preferably 10 wt % or less, and more preferably in the range of 0.1 to 8 wt %. It is not preferred when the moisture content is greater than 10 wt % since there will be a risk of causing deterioration by hydration of the electrode foil. By setting the moisture content relatively high within the range, the ESR of the electrolytic capacitor can be reduced without deterioration of the electrode foil. The moisture in the element herein refers not only to the moisture in the electrolytic solution, but both the moisture in the electrolytic solution and the moisture contained in the element.

(Manufacturing Method of Electrolytic Capacitor)

Well-known methods can be employed as the method for manufacturing the electrolytic capacitor of the present invention. An example can include a method of soaking an element consisting of an anode foil, a cathode foil, and a separator in the electrolytic solution described above, and sealing this in a housing.

EXAMPLES

The Examples of the present invention will be described below.

(A. Examples Related to Phosphoric Acid Ester Amide)

Table 1 shows the composition of electrolytic solutions for electrolytic capacitors employed in Examples, Comparative Examples, and Conventional Examples. These electrolytic solutions were prepared by conventional means, and ammonia gas was injected to adjust the pH for electrolytic solution C. A flame retardant was added to the electrolytic solutions prepared and mixed.

TABLE 1

| | Composition of Electrolytic Solution (wt %) | |
|---|---|---|
| Electrolytic Solution A | γ-Butyrolactone | 75.0 |
| | 1-Ethyl-2,3-methylimidazolinium phthalate | 25.0 |
| Electrolytic Solution B | Sulfolane | 50.0 |
| | γ-Butyrolactone | 25.0 |
| | 1-Ethyl-2,3-dimethylimidazolinium phthalate | 25.0 |
| Electrolytic Solution C | Diethylene glycol | 85.0 |
| | 1,7-Octane dicarboxylic acid | 10.0 |
| | Boric acid | 2.0 |
| | Mannite | 3.0 |
| Electrolytic Solution D | Sulfolane | 8.0 |
| | γ-Butyrolactone | 70.0 |
| | 1-Ethyl-2,3-dimethylimidazolinium phthalate | 13.0 |
| | Boric acid | 4.0 |
| | Mannite | 5.0 |

An electrode leader means was connected to an anode foil subjected to etching and chemical conversion treatments and a cathode foil subjected only to etching treatment, and wound via a separator to form an element. This element was impregnated with the electrolytic solutions prepared, this was housed in a closed-end tubular housing, a sealer consisting of elastic rubber was mounted at the opening of the housing, and the housing was sealed by drawing to prepare an electrolytic capacitor.

(Performance of Electrolytic Capacitor)

Table 2 shows the type of electrolytic solution, the type of flame retardant used, the amount of flame retardant added to the electrolytic solution, the moisture content in the element, the electrostatic capacitance of the electrolytic capacitor, the leakage current, and the ESR measurement results for Examples 1 to 3 and Conventional Example 1. Example 1 employed bis(2,2,2-trifluoroethyl) diethylamide phosphate as the flame retardant, Examples 2 and 3 employed bis(2,2,2-trifluoroethyl) diisopropylamide phosphate and had the moisture content in the element altered, and Conventional Example 1 does not have any flame retardant added. The elements employed here all had a diameter of 10 mm and a length of 25 mm, and those having 35 V to 330 μF were used. The leakage current was the value at 2 minutes of voltage application, the electrostatic capacitance is the value at 120 Hz, and the ESR is the value at 100 kHz.

TABLE 2

| | Type of Electrolytic Solution | Type of Flame Retardant | Amount of Flame-Retardant Added (wt %) | Moisture Content in Element (wt %) | Electrostatic Capacitance (μF) | Leakage Current (μA/2 min) | ESR (mΩ) |
|---|---|---|---|---|---|---|---|
| Example 1 | B | 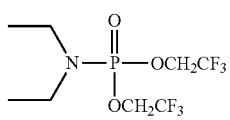 | 15.0 | 3 | 312 | 3.6 | 80 |
| Example 2 | B | 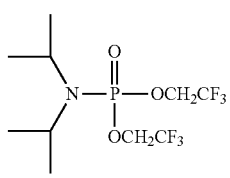 | 15.0 | 8 | 312 | 3.1 | 81 |

TABLE 2-continued

| | Type of Electrolytic Solution | Type of Flame Retardant | Amount of Flame-Retardant Added (wt %) | Moisture Content in Element (wt %) | Electro-static Capacitance (μF) | Leakage Current (μA/2 min) | ESR (mΩ) |
|---|---|---|---|---|---|---|---|
| Example 3 | B | (iPr)₂N—P(=O)(OCH₂CF₃)(OCH₂CF₃) | 15.0 | 3 | 311 | 3.2 | 83 |
| Conventional Example 1 | B | — | 0 | 3 | 311 | 3.3 | 85 |

It was confirmed from Table 2 that the electrolytic capacitors of Examples 1 to 3 which comprise a phosphoric acid ester amide in the electrolytic solution, similarly to Conventional Example 1 without addition of any phosphoric acid ester amide, all operated as electrolytic capacitors without problems. In particular, it is seen that Example 2, due to high moisture content in the element, had a lower ESR than Example 3 or Conventional Example 1 and yielded good properties.

(Self-Extinguishing Property of Element)

In this Example, flame-retardancy was verified by confirming the presence or absence of a self-extinguishing property of the element. An ignition means was brought close to the element impregnated with the electrolytic solution, the flame was applied for 10 seconds, the ignition means was taken away from the element, and the presence or absence of the self-extinguishing property was confirmed. In this experiment, determination was made on whether the burning of the element persisted for 10 seconds or longer after the ignition means was taken away from the element. The test was performed three times for each element.

Table 3 shows the type of electrolytic solution, the type of flame retardant used, the amount of flame retardant added to the electrolytic solution, the moisture content in the element, and the presence or absence of the self-extinguishing property for Examples 4 to 16, Conventional Example 2, and Comparative Examples 1 to 2. In regards to the presence or absence of the self-extinguishing property, ○ shows that burning did not persist for 10 seconds or longer in all three tests and thus the self-extinguishing property is present, and × shows that burning persisted in all three tests and thus the self-extinguishing property is absent. Δ shows that burning persisted in one or two of the three tests and thus the self-extinguishing property is present although insufficient.

Examples 4 to 7 employed bis(2,2,2-trifluoroethyl) diethylamide phosphate as the flame retardant and had the type of electrolytic solution altered, Examples 8 to 9 had the amount of flame retardant added in Example 5 altered, Examples 10 to 13 employed bis(2,2,2-trifluoroethyl) diisopropylamide phosphate as the flame retardant and had the type of electrolytic solution altered, Examples 14 to 16 employed bis(2,2,2-trifluoroethyl) N'-methylpiperadide phosphate, diethyl diethylamide phosphate, and bis(diisopropylamide) 2,2,3,3-tetrafluoropropyl phosphate, respectively, as the flame retardant, Conventional Example employed an element with the same composition as Conventional Example 1, Comparative Example 1 had trimethyl phosphate added as the flame retardant, and Comparative Example 2 had triethyl phosphate added as the flame retardant. Moreover, Examples 10' and 10" had the amount of flame retardant added in Example 10 altered to 5% and 30%, respectively.

Here, Examples 6 and 12 are results of employing elements having a diameter of 10 mm and a length of 20 mm and 400 V to 10 μF, and the other Examples, Conventional Examples, and Comparative Examples are results of employing elements having a diameter of 10 mm and a length of 20 mm and 35 V to 330 μF.

TABLE 3

| | Type of Electrolytic Solution | Type of Flame Retardant | Amount of Flame-Retardant Added (wt %) | Moisture Content in Elemtent (wt %) | Presence of Self-distinguish-ability |
|---|---|---|---|---|---|
| Example 4 | A | (Et)₂N—P(=O)(OCH₂CF₃)(OCH₂CF₃) | 12.0 | 3 | ○ |
| Example 5 | B | (Et)₂N—P(=O)(OCH₂CF₃)(OCH₂CF₃) | 12.0 | 3 | ○ |

TABLE 3-continued

| | Type of Electrolytic Solution | Type of Flame Retardant | Amount of Flame-Retardant Added (wt %) | Moisture Content in Elemtent (wt %) | Presence of Self-distinguish-ability |
|---|---|---|---|---|---|
| Example 6 | C | (C₂H₅)₂N–P(=O)(OCH₂CF₃)–OCH₂CF₃ | 12.0 | 7 | ○ |
| Example 7 | D | (C₂H₅)₂N–P(=O)(OCH₂CF₃)–OCH₂CF₃ | 12.0 | 3 | ○ |
| Example 8 | B | (C₂H₅)₂N–P(=O)(OCH₂CF₃)–OCH₂CF₃ | 10.0 | 3 | Δ |
| Example 9 | B | (C₂H₅)₂N–P(=O)(OCH₂CF₃)–OCH₂CF₃ | 20.0 | 3 | ○ |
| Example 10 | A | (iPr)₂N–P(=O)(OCH₂CF₃)–OCH₂CF₃ | 12.0 | 3 | ○ |
| Example 10' | A | (iPr)₂N–P(=O)(OCH₂CF₃)–OCH₂CF₃ | 5.0 | 3 | Δ |
| Example 10" | A | (iPr)₂N–P(=O)(OCH₂CF₃)–OCH₂CF₃ | 30.0 | 3 | ○ |

TABLE 3-continued

| | Type of Electrolytic Solution | Type of Flame Retardant | Amount of Flame-Retardant Added (wt %) | Moisture Content in Elemtent (wt %) | Presence of Self-distinguish-ability |
|---|---|---|---|---|---|
| Example 11 | B | 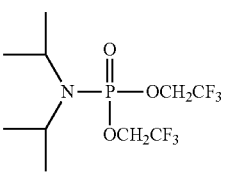 | 12.0 | 3 | ○ |
| Example 12 | C | 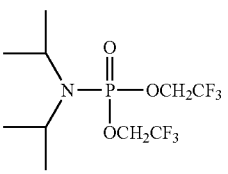 | 12.0 | 7 | ○ |
| Example 13 | D | 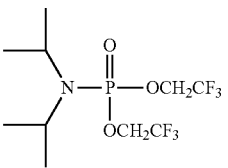 | 12.0 | 3 | ○ |
| Example 14 | B | 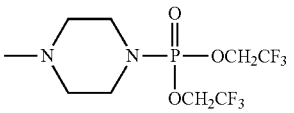 | 12.0 | 3 | ○ |
| Example 15 | B | 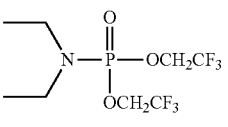 | 15.0 | 3 | Δ |
| Example 16 | B | 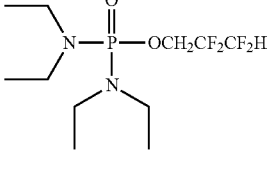 | 15.0 | 3 | Δ |
| Conventional Example 2 | B | — | 0 | 3 | X |
| Comparative Example 1 | B | TMP | 12.0 | 3 | Δ |
| Comparative Example 2 | B | TEP | 12.0 | 3 | Δ |

TMP: trimethylphosphate
TEP: triethylphosphate

It could be confirmed from the results of Table 3 that Conventional Example 2 without any flame retardant added did not have the self-extinguishing property and continued to burn, whereas Examples 4 to 16 and Comparative Examples 1 to 2 had the self-extinguishing property. However, it is thought that although Example 8 with a decreased amount of flame retardant added, Example 15 employing a flame retardant which does not have a fluorine atom in the ester side chain, Example 16 employing a flame retardant having two amide groups, and Comparative Examples 1 and 2 employing trialkyl phosphate have the self-extinguishing property, they could not yield effects that could withstand three burn tests. Moreover, it is seen from Examples 10, 10', and Example 10" that the amount of bis(2,2,2-trifluoroethyl) diisopropylamide phosphate added is preferably more than 5 wt % and 30 wt % or less.

(Prolonged Effectiveness of the Self-Extinguishing Property)

Table 4 shows the type of electrolytic solution, the type of flame retardant used, the amount of flame retardant added to the electrolytic solution, the moisture content in the element, and the presence or absence of the self-extinguishing property for Examples 17 to 22 and Comparative Examples 3 to 4. Example 17 is a result of using an element with the same composition as Example 5, Example 18 is the result of having the moisture content in the element in Example 11 at 0.1 wt %, Example 19 is the result of having the moisture content in the element in Example 11 at 10 wt %, Examples 20 to 22 are results of using an element with the same composition as Examples 14 to 16, respectively, and Comparative Examples 3 and 4 are results of employing an element with the same composition as Comparative Examples 1 and 2, respectively. The elements used here all had a diameter of 10 mm and a length of 20 mm, and elements having 35 V to 330 μF were used.

Electrolytic capacitors were prepared with these elements, and after leaving at 125° C. for 500 hours with no load, the elements were removed from the housing, and the presence or absence of the self-extinguishing property was confirmed.

TABLE 4

| | Type of Electrolytic Solution | Type of Flame Retardant | Amount of Flame-Retardant Added (wt %) | Moisture Content in Element (wt %) | Presence of Self-distinguish-ability |
|---|---|---|---|---|---|
| Example 17 | B | (Et)₂N—P(=O)(OCH₂CF₃)₂ | 12.0 | 3 | ○ |
| Example 18 | B | (iPr)₂N—P(=O)(OCH₂CF₃)₂ | 12.0 | 0.1 | ○ |
| Example 19 | B | (iPr)₂N—P(=O)(OCH₂CF₃)₂ | 12.0 | 10 | ○ |
| Example 20 | B | MeN(piperazinyl)—P(=O)(OCH₂CF₃)₂ | 12.0 | 3 | ○ |
| Example 21 | B | (Et)₂N—P(=O)(OCH₂CF₃)₂ | 15.0 | 3 | △ |
| Example 22 | B | (pyrrolidinyl)—P(=O)(OCH₂CF₂CF₂H)(NEt₂) | 15.0 | 3 | △ |
| Comparative Example 3 | B | TMP | 12.0 | 3 | X |
| Comparative Example 4 | B | TEP | 12.0 | 3 | X |

Comparative Examples 3 and 4 employing an element with the same composition as Comparative Examples 1 and 2 in Table 3 initially had the self-extinguishing property (Table 3), but the flame-retardant effect disappeared after a prolonged period of time (Table 4). In contrast, it was seen that Examples 17 to 22 had a flame-retardant effect even after a prolonged period of time. From this result, it is thought that TMP and TEP employed in Comparative Examples were hydrolyzed and the flame-retardant effect disappeared, but in Examples 17 to 22, good flame-retardant effect was maintained even after a prolonged period of time since phosphoric acid ester amides are less susceptible to hydrolysis. In particular, Example 19 having the moisture content in the element at 10 wt % shows that flame-retardancy is maintained, i.e., shows that it is possible to provide flame-retardant electrolytic capacitors having good properties such as those shown in Table 2, even in cases where the moisture content in the element is relatively high.

(Prolonged Performance of Electrolytic Capacitor)

In Table 5, after applying a voltage of 35 V to the capacitors of Examples 1 to 3 and Conventional Example 1 at 125° C. for 500 hours, the electrostatic capacitance of the electrolytic capacitor, the leakage current, the ESR were measured again. Moreover, the elements were removed from the housing after measurement, and the presence or absence of the self-extinguishing property was confirmed. The results are shown respectively as Examples 1' to 3' and Conventional Example 1' in Table 5.

flame retardant was altered. The voltage proof was set as the voltage value when a spike or a scintillation was first observed in the ascending curve of voltage-time, when a constant current (3 mA) was applied. Examples 23 and 24

TABLE 5

| | Type of Electrolytic Solution | Type of Flame Retardant | Amount of Flame-Retardant Added (wt %) | Moisture Content in Element (wt %) | Electro-Static-Capacitance (μF) | Leakage Current (μA/2 min) | ESR (mΩ) | Presence of Self-distinguish-ability |
|---|---|---|---|---|---|---|---|---|
| Example 1' | B | (structure) | 15.0 | 3 | 305 | 2.8 | 84 | ○ |
| Example 2' | B | (structure) | 15.0 | 8 | 302 | 2.7 | 85 | ○ |
| Example 3' | B | (structure) | 15.0 | 3 | 308 | 2.8 | 89 | ○ |
| Conventional Example 1' | B | — | 0 | 3 | 304 | 2.9 | 91 | X |

It is seen from Table 5 that the electrolytic capacitors of Examples 1 to 3 not only maintains flame-retardancy over a prolonged period of time, but the electrolytic capacitor performance is also maintained without problems.

(Voltage Proof Properties of Electrolytic Capacitor)

Table 6 shows the measurement results of the voltage proof property of electrolytic capacitors when the type of flame retardant was altered. Voltage proof was set as the voltage value when a spike or a scintillation was first observed in the ascending curve of voltage-time, when a constant current (3 mA) was applied. Examples 23 and 24 had the amount of flame retardant added in Example 13 altered, Conventional Example 3 does not have any flame retardant added, and Comparative Example 5 had the type of electrolytic solution and the amount of flame retardant added in Comparative Example 2 altered. The elements used here all had a diameter of 10 mm and a length of 20 mm, and elements having 35 V to 330 μF were used.

TABLE 6

| | Type of Electrolytic Solution | Type of Flame Retardant | Amount of Flame-Retardant Added (wt %) | Moisture Content in Element (wt %) | Voltage proof (V) |
|---|---|---|---|---|---|
| Example 23 | D | (structure) | 10.0 | 3 | 254 |
| Example 24 | D | (structure) | 15.0 | 3 | 284 |
| Conventional Example 3 | D | — | 0 | 3 | 189 |

TABLE 6-continued

| | Type of Electrolytic Solution | Type of Flame Retardant | Amount of Flame-Retardant Added (wt %) | Moisture Content in Element (wt %) | Voltage proof (V) |
|---|---|---|---|---|---|
| Comparative Example 5 | D | TEP | 10.0 | 3 | 200 |

It was seen from Table 6 that the electrolytic capacitors of Examples 23 and 24 are significantly improved in voltage proof compared to Conventional Example 3 without any flame retardant added or Comparative Example 5 having TEP added.

Although wound electrolytic capacitors were employed for the present Examples, these are not limiting, and may also be applied to laminated electrolytic capacitors.

Although a fluorine-containing phosphoric acid ester amide, which is a flame retardant, was directly added to the electrolytic solution in the present Examples, these are not limiting, and a microcapsulated flame retardant in which a flame retardant is encapsulated in a shell material such as polyphenylene sulfide may also be added to the electrolytic solution.

(B. Examples Related to Phosphate Diester Anion)

Table 7 shows the composition of electrolytic solutions for electrolytic capacitors employed in the Examples and Conventional Example below. These electrolytic solutions were prepared by conventional means, and for electrolytic solutions E, F, G, G', G", and H, ammonia gas was injected to adjust the pH, and then a flame retardant was further added and mixed. For electrolytic solution tripropylamine was added and the pH was adjusted, and then a flame retardant was further added and mixed. Here, electrolytic solutions E, F, G, and G' employed a mixed solvent of ethylene glycol and diethylene glycol monobutyl ether as a protic polar solvent, G" employed a mixed solvent of diethylene glycol and diethylene glycol monobutyl ether as a protic polar solvent, and electrolytic solutions G, G', and G" comprise bis(2,2,2-trifluoroethyl) phosphate. Electrolytic solution H is an electrolytic solution having ethylene glycol as the solvent, and electrolytic solution I is an electrolytic solution having γ-butyrolactone as the main solvent.

TABLE 7

| Composition of Electrolytic Solution (wt %) | | |
|---|---|---|
| Electrolytic Solution E | Ethylene glycol | 65.0 |
| | Diethylene glycol monobutyl ether | 22.0 |
| | Azelaic acid | 8.0 |
| | Boric acid | 2.0 |
| | Mannite | 3.0 |
| Electrolytic Solution F | Ethylene glycol | 34.0 |
| | Diethylene glycol monobutyl ether | 53.0 |
| | Azelaic acid | 8.0 |
| | Boric acid | 2.0 |
| | Mannite | 3.0 |
| Electrolytic Solution G | Ethylene glycol | 71.0 |
| | Diethylene glycol monobutyl ether | 22.0 |
| | Bis(2,2,2-trifluoroethyl)phosphate | 5.0 |

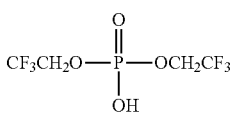

| | Azelaic acid | 2.0 |

TABLE 7-continued

| Composition of Electrolytic Solution (wt %) | | |
|---|---|---|
| Electrolytic Solution G' | Ethylene glycol | 50.0 |
| | Diethylene glycol monobutyl ether | 10.0 |
| | Bis(2,2,2-trifluoroethyl)phosphate | 38.0 |

$$CF_3CH_2O-\overset{\overset{O}{\|}}{\underset{\underset{OH}{|}}{P}}-OCH_2CF_3$$

| | Azelaic acid | 2.0 |
| Electrolytic Solution G" | Diethylene glycol | 83.0 |
| | Diethylene glycol monobutyl ether | 5.0 |
| | Bis(2,2,2-trifluoroethyl)phosphate | 10.0 |

$$CF_3CH_2O-\overset{\overset{O}{\|}}{\underset{\underset{OH}{|}}{P}}-OCH_2CF_3$$

| | Azelaic acid | 2.0 |
| Electrolytic Solution H | Ethylene glycol | 87.0 |
| | Azelaic acid | 8.0 |
| | Boric acid | 2.0 |
| | Mannite | 3.0 |
| Electrolytic Solution I | γ-Butyrolactone | 80.0 |
| | Ethylene glycol | 10.0 |
| | Azelaic acid | 5.0 |
| | Boric acid | 2.0 |
| | Mannite | 3.0 |

An electrode leader means was connected to an anode foil subjected to etching and chemical conversion treatments and a cathode foil subjected only to etching treatment, and wound via a separator to form an element. This element was impregnated with the electrolytic solutions prepared, this was housed in a closed-end tubular housing, a sealer consisting of elastic rubber was mounted at the opening of the housing, and the housing was sealed by drawing to prepare an electrolytic capacitor.

(Performance of Electrolytic Capacitor)

Table 8 shows the type of electrolytic solution, the type of flame retardant used, the amount of flame retardant added to the electrolytic solution, the moisture content in the element, the electrostatic capacitance of the electrolytic capacitor, the leakage current, the ESR, and the self-extinguishing property measurement results for Examples 25 to 29 and Conventional Example 4. Examples 25 to 29 all employed bis(2,2,2-trifluoroethyl) diisopropylamide phosphate as the flame retardant, Examples to 29 additionally contain bis(2,2,2-trifluoroethyl) phosphate anions, and Conventional Example 4 does not have any flame retardant added.

The elements employed here all have a diameter of 10 mm and a length of 25 mm and 450 V to 12 μF. The leakage current was the value at 2 minutes of voltage application, the electrostatic capacitance is the value at 120 Hz, and the ESR is the value at 100 kHz. Moreover, for the self-extinguishing property, as described above, an ignition means was brought close to the element impregnated with the electrolytic solution, the flame was applied for 10 seconds, and determination was made on whether the burning of the element persisted for 10 seconds or longer after the ignition means was taken away from the element. The test was performed three times for each element, ○ shows that burning did not persist for 10 seconds or longer in all three tests and thus the self-extinguishing property is present. x shows that burning persisted in all three tests and thus the self-extinguishing property is absent, Δ shows that burning persisted in one or two of the three tests and thus the self-extinguishing property is present although insufficient.

the flame retardant have superior flame-retardancy than Example 25 comprising only bis(2,2,2-trifluoroethyl) diisopropylamide phosphate at 10 wt % as the flame retardant, and have a better ESR value than Example 26 comprising only bis(2,2,2-trifluoroethyl) diisopropylamide phosphate at 18 wt % as the flame retardant. Because the electrolytic capacitor of Example 28 has an increased amount of bis(2,2,2-trifluoroethyl) phosphate anions added, it could operate with an element having a diameter of 10 mm, a length of 25 mm and 250 V-to 47 ρF, but not with an element having a diameter of 10 mm, a length of 25 mm and 450 V to 12 μF.

(Performance of High-Pressure Electrolytic Capacitor)

TABLE 8

| | Type of Electrolytic Solution | Type of Flame Retardant | Flame Retardant Structure | Amount of Flame-Retardant Added (wt %) | Moisture Content in Element (wt %) | Electrostatic Capacitance (μF) | Leakage Current (μA/5 min) | ESR (Ω) | Presence of Self-Distinguishability |
|---|---|---|---|---|---|---|---|---|---|
| Example 25 | E | | (iPr)₂N—P(=O)(OCH₂CF₃)₂ | 10.0 | 3 | 12.3 | 1.57 | 4.07 | Δ |
| Example 26 | F | | (iPr)₂N—P(=O)(OCH₂CF₃)₂ | 18.0 | 3 | 12.1 | 1.55 | 4.32 | ○ |
| Example 27 | G | | (iPr)₂N—P(=O)(OCH₂CF₃)₂ | 10.0 | 3 | 12.6 | 1.42 | 3.91 | ○ |
| Example 28 | G' | | (iPr)₂N—P(=O)(OCH₂CF₃)₂ | 10.0 | 3 | 48.9 | 0.29 | 2.07 | ○ |
| Example 29 | G" | | (iPr)₂N—P(=O)(OCH₂CF₃)₂ | 10.0 | 3 | 12.3 | 1.32 | 3.21 | ○ |
| Conventional Example 4 | H | — | | 0 | 3 | 12.6 | 1.56 | 3.62 | X |

It was confirmed from Table 8 that the electrolytic capacitors of Examples 25 to 29, similarly to Conventional Example 4, all operated as electrolytic capacitors without problems. Moreover, the electrolytic capacitors of Examples 25 to 29 were superior in the self-extinguishing property compared to the capacitor of Conventional Example 4.

Moreover, it is seen that Examples 27 to 29 comprising both bis(2,2,2-trifluoroethyl) diisopropylamide phosphate at 10 wt % and bis(2,2,2-trifluoroethyl) phosphate anions as Next, in order to compare the performance of high-pressure electrolytic capacitors, as shown in Table 9, in Example 30, electrolytic solution I comprising γ-butyrolactone as shown in Table 7 was used as the type of electrolytic solution, and bis(2,2,2-trifluoroethyl) diisopropylamide phosphate was further employed as the flame retardant to prepare an electrolytic capacitor. In contrast, in Conventional Example 5, electrolytic solution C shown in Table 1 was used as the type of electrolytic solution, and no flame retardant was added. Moreover, the elements employed here all have a diameter of 10 mm and a length of 25 mm and 450 V to 12 µF. The leakage current was the value at 5 minutes of voltage application, the electrostatic capacitance is the value at 120 Hz, and the ESR is the value at 100 kHz. Moreover, for the self-extinguishing property, as described above, an ignition means was brought close to the element impregnated with the electrolytic solution, the flame was applied for 10 seconds, and determination was made on whether the burning of the element persisted for 10 seconds or longer after the ignition means was taken away from the element. The test was performed three times for each element, ○ shows that burning did not persist for 10 seconds or longer in all three tests and thus the self-extinguishing property is present. x shows that burning persisted in all three tests and thus the self-extinguishing property is absent, Δ shows that burning persisted in one or two of the three tests and thus the self-extinguishing property is present although insufficient.

Table 9 shows the type of electrolytic solution, the type of flame retardant used, the amount of flame retardant added to the electrolytic solution, the moisture content in the element, the electrostatic capacitance of the electrolytic capacitor, the leakage current, the ESR, and the self-extinguishing property measurement results for Example 30 and Conventional Example 5.

TABLE 9

| | Type of Electrolytic Solution | Type of Flame Retardant | Amount of Flame-Retardant Added (wt %) | Moisture Content in Element (wt %) | Electro-static Capacitance (µF) | Leakage Current (µA/5 min) | ESR (Ω) | Presence of Self-Distinguish-ability |
|---|---|---|---|---|---|---|---|---|
| Example 30 | 1 | (iPr)₂N–P(=O)(OCH₂CF₃)(OCH₂CF₃) | 18.0 | 3 | 12.4 | 1.45 | 3.66 | ○ |
| Conventional Example 5 | C | — | 0 | 3 | 12.4 | 1.52 | 3.58 | X |

It was confirmed from Table 9 that the electrolytic capacitor of Example 30, similarly to Conventional Example 5, operates as a high-pressure electrolytic capacitor without problems. Moreover, it was seen that the electrolytic capacitor of Example 30 was superior in the self-extinguishing property compared to the capacitor of Conventional Example 5.

(Prolonged Performance of Electrolytic Capacitor)

Next, a voltage of 450 V was applied to the electrolytic capacitor of the Examples 27, 29, and 30 and the electrolytic capacitor of Conventional Example 5 at 105° C. for 1000 hours, and the electrostatic capacitance of the electrolytic capacitor, the leakage current, and the ESR were measured again. Moreover, the elements were removed from the housing after measurement, and the presence or absence of the self-extinguishing property was confirmed. The results are shown respectively as Examples 27', 29', and 30' and Conventional Example 5' in Table 10.

TABLE 10

| | Type of Electrolytic Solution | Type of Flame Retardant | Amount of Flame-Retardant Added (wt %) | Moisture Content in Element (wt %) | Electro-static Capacitance (µF) | Leakage Current (µA/5 min) | ESR (Ω) | Presence of Self-Distinguish-ability |
|---|---|---|---|---|---|---|---|---|
| Example 30 | G | (iPr)₂N–P(=O)(OCH₂CF₃)(OCH₂CF₃) | 10.0 | 3 | 12.8 | 0.22 | 3.92 | ○ |

TABLE 10-continued

| Type of Electrolytic Solution | Type of Flame Retardant | | Amount of Flame-Retardant Added (wt %) | Moisture Content in Element (wt %) | Electrostatic Capacitance (μF) | Leakage Current (μA/5 min) | ESR (Ω) | Presence of Self-Distinguish-ability |
|---|---|---|---|---|---|---|---|---|
| Conventional Example 5 | G'' | 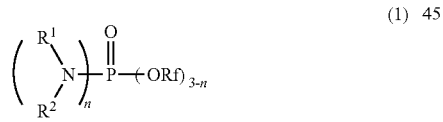 | 10.0 | 3 | 12.8 | 0.22 | 3.25 | ○ |
| Example 30' | I | 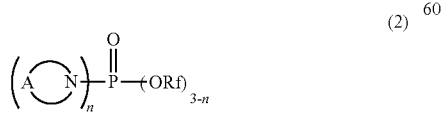 | 18.0 | 3 | 12.6 | 0.32 | 4.49 | ○ |
| Conventional Example 5' | C | — | 0 | 3 | 12.7 | 0.25 | 4.42 | X |

It was seen from Table 10 that the electrolytic capacitors of Examples 27', 29', and 30' had superior the self-extinguishing property even after a prolonged period of time compared to the capacitor of Conventional Example 5', and the electrolytic capacitor performance was also sustained for a prolonged period of time without problems.

The invention claimed is:

1. A flame-retardant electrolytic capacitor comprising:
   an anode foil that is provided with an oxide film on the surface;
   a cathode foil;
   a separator; and
   an electrolytic solution that contains a solute in a solvent, wherein a phosphoric acid ester amide represented by the following general formula (1) or the following general formula (2) is contained in the electrolytic solution:

[Chemical Formula 1]

$$\left(\begin{matrix}R^1\\R^2\end{matrix}N\right)_n \overset{O}{\underset{\|}{P}} (ORf)_{3-n} \quad (1)$$

in which n is 1 or 2, and $R^1$ and $R^2$ each independently represent a linear or branched alkyl group having 1 to 10 carbon atoms, and Rf represents a linear or branched fluoroalkyl group having 1 to 10 carbon atoms or a linear or branched alkyl group having 1 to 10 carbon atoms;

[Chemical Formula 2]

$$\left(A\!\!-\!\!N\right)_n \overset{O}{\underset{\|}{P}} (ORf)_{3-n} \quad (2)$$

in which n is 1 or 2, and A represents a polymethylene group having 4 to 7 carbon atoms, a group in which at least one position of the C—C bonds in a polymethylene group having 4 to 7 carbon atoms is a C—O—C bond, a group in which at least one position of the C—C bonds in a polymethylene group having 4 to 7 carbon atoms is a C—NH—C bond, or a group in which at least one position of the C—C bonds in a polymethylene group having 4 to 7 carbon atoms is a C—N(CH$_3$)—C bond, and Rf represents a linear or branched fluoroalkyl group having 1 to 10 carbon atoms or a linear or branched alkyl group having 1 to 10 carbon atoms.

2. The flame-retardant electrolytic capacitor according to claim 1, wherein the phosphoric acid ester amide is represented by the following general formula (3) or the following general formula (4):

[Chemical Formula 3]

$$\begin{matrix}R^{1'}\\R^{2'}\end{matrix}N\!\!-\!\!\overset{O}{\underset{\|}{P}}\!\!(ORF')_2 \quad (3)$$

in which $R^{2'}$ and $R^{2'}$ each independently represent a linear or branched alkyl group having 1 to 10 carbon atoms, and Rf' represents a linear or branched fluoroalkyl group having 1 to 10 carbon atoms;

[Chemical Formula 4]

$$A\!\!-\!\!N\!\!-\!\!\overset{O}{\underset{\|}{P}}\!\!(ORf')_2 \quad (4)$$

in which A represents a polymethylene group having 4 to 7 carbon atoms, a group in which at least one position of the C—C bonds in a polymethylene group having 4 to 7 carbon atoms is a C—O—C bond, a group in which at least one position of the C—C bonds in a polymethylene group having 4 to 7 carbon atoms is a C—NH—C bond, or a group in which at least one position of the C—C bonds in a polymethylene group having 4 to 7 carbon atoms is a C—N(CH$_3$)—C bond, and Rf' represents a linear or branched fluoroalkyl group having 1 to 10 carbon atoms.

3. The flame-retardant electrolytic capacitor according to claim 1, wherein the phosphoric acid ester amide represented by the general formula (1) or (2) is contained at 5 to 30 wt % of the total electrolytic solution.

4. The flame-retardant electrolytic capacitor according to claim 1, wherein a phosphate diester anion represented by the following general formula (5) is further contained in the electrolytic solution:

[Chemical Formula 5]

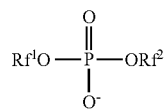
(5)

in which Rf$^1$ and Rf$^2$ represents a linear or branched fluoroalkyl group having 1 to 10 carbon atoms or a linear or branched alkyl group having 1 to 10 carbon atoms.

5. The flame-retardant electrolytic capacitor according to claim 4, wherein the phosphate diester anion represented by the general formula (5) is contained at up to 50 wt % of the total electrolytic solution.

6. The flame-retardant electrolytic capacitor according to claim 1, wherein moisture content in an element of the electrolytic capacitor is 10 wt % or less.

7. The flame-retardant electrolytic capacitor according to claim 2, wherein the phosphoric acid ester amide represented by the general formula (3) or (4) is contained at 5 to 30 wt % of the total electrolytic solution.

8. The flame-retardant electrolytic capacitor according to claim 2, wherein a phosphate diester anion represented by the following general formula (5) is further contained in the electrolytic solution:

[Chemical Formula 5]

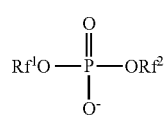
(5)

in which Rf$^1$ and Rf$^2$ represents a linear or branched fluoroalkyl group having 1 to 10 carbon atoms or a linear or branched alkyl group having 1 to 10 carbon atoms.

9. The flame-retardant electrolytic capacitor according to claim 3, wherein a phosphate diester anion represented by the following general formula (5) is further contained in the electrolytic solution:

[Chemical Formula 5]

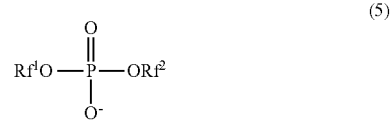
(5)

in which Rf$^1$ and Rf$^2$ represents a linear or branched fluoroalkyl group having 1 to 10 carbon atoms or a linear or branched alkyl group having 1 to 10 carbon atoms.

10. The flame-retardant electrolytic capacitor according to claim 7, wherein a phosphate diester anion represented by the following general formula (5) is further contained in the electrolytic solution:

[Chemical Formula 5]

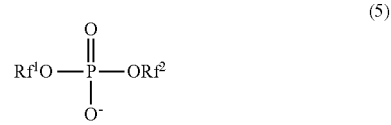
(5)

in which Rf$^1$ and Rf$^2$ represents a linear or branched fluoroalkyl group having 1 to 10 carbon atoms or a linear or branched alkyl group having 1 to 10 carbon atoms.

11. The flame-retardant electrolytic capacitor according to claim 8, wherein the phosphate diester anion represented by the general formula (5) is contained at up to 50 wt % of the total electrolytic solution.

12. The flame-retardant electrolytic capacitor according to claim 9, wherein the phosphate diester anion represented by the general formula (5) is contained at up to 50 wt % of the total electrolytic solution.

13. The flame-retardant electrolytic capacitor according to claim 10, wherein the phosphate diester anion represented by the general formula (5) is contained at up to 50 wt % of the total electrolytic solution.

14. The flame-retardant electrolytic capacitor according to claim 2, wherein moisture content in an element of the electrolytic capacitor is 10 wt % or less.

* * * * *